United States Patent [19]

Welch et al.

[11] 4,451,879
[45] May 29, 1984

[54] CIRCUIT FOR PROVIDING A COMMON SETPOINT FOR MANUAL AND AUTOMATIC REGULATION OF A PROCESS CONTROL SYSTEM

[75] Inventors: Norman D. Welch; John W. Woestman, both of Lancaster, Pa.

[73] Assignee: RCA Corporation, New York, N.Y.

[21] Appl. No.: 311,260

[22] Filed: Oct. 14, 1981

[51] Int. Cl.³ .............................................. G05B 7/02
[52] U.S. Cl. .................................. 364/181; 318/591; 364/160
[58] Field of Search ...................... 364/180, 181, 160; 318/590, 591

[56] References Cited

U.S. PATENT DOCUMENTS

| 3,034,718 | 5/1962 | Freitas et al. | 364/181 X |
| 3,576,535 | 4/1971 | Turner | 318/591 X |
| 3,694,633 | 9/1972 | Lejon | 318/591 X |
| 3,772,602 | 11/1973 | Kobayashi | 318/591 X |
| 4,035,620 | 7/1977 | Hobbs et al. | 364/181 |
| 4,118,772 | 10/1978 | Takada | 364/181 X |

OTHER PUBLICATIONS

On-Off Static Output Servo Amplifier AD-800 Series by Foxboro/Jordon, Inc. IM-0483-pp. 1 to 7, Nov., 1979.
National Semiconductor, LM555/LM555C Timer, pp. 9-29 to 9-34.
North American Philips Controls, Stepper Motor IC Driver Series SAA 1027, four pages, 1977.

*Primary Examiner*—Joseph F. Ruggiero
*Attorney, Agent, or Firm*—Eugene M. Whitacre; Dennis H. Irlbeck; Lester L. Hallacher

[57] ABSTRACT

A circuit for providing a common setpoint for both automatic and manual operation of a process control system includes a process controller. A parameter of the process can be changed by changing the output of a controller. A variable input voltage to the process controller establishes the setpoint of the parameter. Changes in the variable voltage are made either manually or automatically so that a common setpoint is established for both types of operation.

4 Claims, 1 Drawing Figure

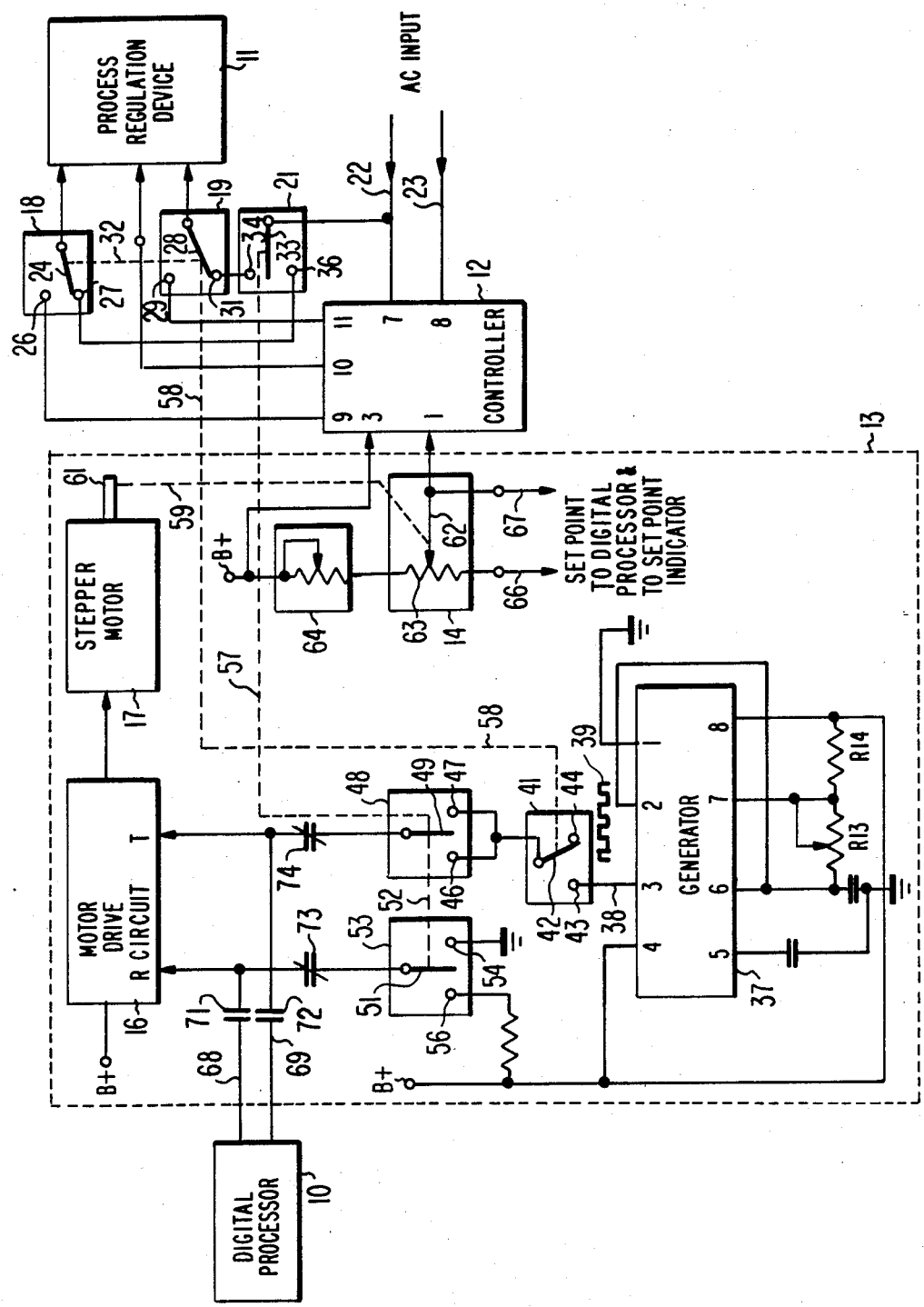

CIRCUIT FOR PROVIDING A COMMON SETPOINT FOR MANUAL AND AUTOMATIC REGULATION OF A PROCESS CONTROL SYSTEM

BACKGROUND OF THE INVENTION

This invention relates generally to process control equipment and particularly to a circuit for providing a common setpoint for manual and automatic regulation of such equipment.

Frequently, process control equipment is selectively controlled either manually or automatically by a digital processor, such as a programmable computer or microprocessor. Typically, the equipment operates in the automatic mode and values, commonly called setpoints, of the controlled parameters are provided by the digital processor. The manual mode of operation is used to assume control from the digital processor in specified instances. Hence, the manual mode is used in such instances as the breakdown of the digital processor or to run tests on the process being controlled. Problems sometimes arise when changing from one mode of operation to the other because the setpoints of the controlled parameters are provided by the digital processor when in the automatic mode and by manual settings when in the manual mode. Frequently the setpoints established manually by the operator during the manual mode of operation are different from those established by the digital processor in the automatic mode of operation. Switching between modes of operation when the setpoints are different, frequently causes severe equipment, process and operation problems.

As an example, an automatically controlled shadow mask etch line typically controls such parameters as the pressure of the etchant and the speed of a metal web along the line. In automatic operation, the setpoints representative of these parameters are provided by the digital processor and are continually updated by the processor to maintain optimum control over the process. However, when the etch line is put in the manual mode, the setpoints are provided manually. Typically, the manually provided set points are different from those previously provided by the digital processor. The new setpoints must be provided to the digital processor in order to have commonality of setpoints for both manual and automatic operation. If the manually established setpoints are not provided to the digital processor switching from manual operation to automatic operation will return the system to the setpoints previously provided by the digital processor and the benefits of the setpoints established manually are lost. Problems also can arise if the setpoints established by the digital processor are provided to the operator when switching to manual mode. Switching operational modes with different setpoints frequently results in the manufacture of defective products and safety hazards to the operating personnel.

The instant invention overcomes these disadvantages by the provision of a circuit for providing a common setpoint for both manual and automatic regulation of process control equipment.

SUMMARY OF THE INVENTION

A process control system having a digital processor for optimizing the controlled process includes a regulation device selectively controlled manually or automatically by a controller to regulate a parameter of the process. A circuit for providing a common setpoint for both manual and automatic control includes a variable voltage input device to provide a variable setpoint voltage to the controller and the digital processor. A generator provides a repetitive output signal. Means for varying the variable voltage input device varies the setpoint and is selectively responsive to the digital processor and to the repetitive output signal. Switches are provided for selecting manual and automatic control whereby the voltage varying means is responsive to the digital processor during automatic control and is responsive to the repetitive output signal during manual control.

BRIEF DESCRIPTION OF THE DRAWING

The FIGURE is a preferred embodiment of the invention shown in schematic form.

DETAILED DESCRIPTION OF THE PREFERRED EMBODIMENT

In the FIGURE a digital processor 10, such as a programmable computer or a microprocessor optimizes the parameters of a process and provides the setpoints required to maintain the optimum parameters. A process regulation device 11, such as a valve or motor, is regulated by a controller 12 and a setpoint control circuit 13. The controller 12 receives the actual process parameters from sensors and regulates the process regulation device 11 to maintain the parameter at the required values. The setpoint control circuit 13 provides a common setpoint to the controller 12 when the system is in either an automatic or a manual mode of operation. Included in the setpoint control circuit 13 is a potentiometer 14 which serves as variable voltage input device to the controller 12. The potentiometer 14 is controlled by either the digital processor 10 or by manual operation through a motor drive circuit 16 and a stepper motor 17.

During the operation of the process equipment, the regulation device 11 controls a parameter of the process, such as the line speed or the pressure of an etchant used in a shadow mask etch line. The actual value of the controlled parameter is sensed and the value provided to the controller 12. The controller 12 compares the sensed value with the setpoint value and controls the regulation device 11 to cause the sensed value to correspond to the setpoint value. This technique is standard in the process control art and details are not included herein.

Arranged between the regulation device 11 and the controller 12 are two switches 18 and 19. An additional switch 21 is arranged between the switch 19 and an input line 22. The input line 22 and an input line 23 are used to provide an AC voltage input to the controller 12. The switch 18 has a movable contact 24 and two fixed contacts 26 and 27. The switch 19 also has a movable contact 28 and two fixed contacts 29 and 31. The movable contacts 24 and 28 of the switches 18 and 19 respectively are mechanically coupled by a coupling 32 so that the contacts simultaneously move upon manual actuation. The switch 21 includes a movable contact 33 and two fixed contacts 34 and 36. The fixed contact 34 of the switch 21 is electrically coupled to the fixed contact 31 of the switch 19. Similarly, the fixed contact 36 of the switch 21 is electrically coupled to the fixed contact 27 of the switch 18. Accordingly, when the movable contacts 24 and 28 respectively contact the fixed contacts 27 and 31, the regulation device 11 can be manually adjusted by operation of the movable contact 33 of the switch 21. When the movable contacts 24 and 28 respectively contact the fixed contacts 26 and 29, the regulation device 11 is under the control of the controller 12. The regulation device 11 therefore is regulated by the controller 12 during automatic operation of the process and by an operator during manual operation of the process. The controller 12 can be a Jordan 8800 series servo controller which is readily available in the art.

The circuit 13 for providing a common setpoint, includes a signal generator 37 which provides a repetitive output signal 39 on an output lead 38. The output signal 39 preferably is a square wave signal and thus, the signal generator 37 can be a square wave generator; for example, an LM555 Timer manufactured by National Semiconductor. The output frequency of the square wave generator 37 is determined by two resistors R13 and R14. Thus when the variable resistor R13 is adjusted, the output frequency can be fine tuned as desired.

The output lead 38 of the square wave generator 37 is coupled to a fixed contact 43 of a switch 41 which has another fixed contact 44 and a movable contact 42. The movable contact 42 is electrically coupled to two fixed contacts 46 and 47 of a switch 48 which has a movable contact 49 electrically coupled to the T input of the motor driver circuit 16. A mechanical coupling 52 connects the movable contact 49 of the switch 48 to a movable contact 51 of a switch 53 which also includes fixed contacts 54 and 56 which respectively are grounded and coupled to the B+ bias voltage. The movable contact 51 of the switch 53 is electrically coupled to the R input of the motor drive circuit 16. The movable contacts 49 and 51 are mechanically coupled to the movable contact 33 of the switch 21 by another mechanical coupling 57. The movable arm 42 of the switch 41 is mechanically coupled to the movable arm 28 of the switch 19 by a coupling 58.

A mechanical coupling 59 couples the output shaft 61 of the stepper motor 17 to a wiper arm 62 of the potentiometer 14. Accordingly, rotation of the shaft 61 causes the wiper 62 to slide along a resistive element 63 of the potentiometer 14. The resistive element 63 is coupled to the B+ supply so that movement of the arm 62 causes changes in the input voltage to controller 12. The potentiometer voltage which is applied to the controller 12 is the setpoint value for a parameter of the process which the controller 12 compares with the sensed valve to regulate the regulation device 11. An additional potentiometer 64 can be manually adjusted to fine tune the input voltage to the controller 12. Output leads 66 and 67 of the potentiometer 14 sense the voltage across the potentiometer 14 and provide the setpoint to the digital processor 10 and also to a setpoint indicator (not shown) which is used to display the setpoint voltage to the operator in either digital or analog form.

With the inventive circuit, the setpoint can be set either manually or automatically. When set automatically, the digital processor 10 establishes the setpoint value which optimizes the process parameter being controlled. This optimization is dependent upon the particular process being controlled, and is standard in the process control art. Changes in the setpoint which are established by the digital processor 10 are input to the motor drive circuit 16 over output leads 68 and 69 through normally open contacts 71 and 72. Two normally closed contacts 73 and 74 are arranged between the motor drive circuit 16 and the switches 53 and 48 respectively. When the process is being controlled automatically the digital processor 10 energizes a coil (not shown) to close the contacts 71 and 72 and open the contacts 73 and 74. The motor drive circuit 16, which can be a North American Philips Series SAA 1027 circuit, energizes the stepper motor 17 to rotate the shaft 61 in a direction determined by the level of the signal provided to the R input of the motor drive 16. Thus, when the signal to the R input is high, the stepper motor rotates counterclockwise and when the signal to the R input is low, the stepper motor rotates clockwise. The repetition rate of the signal provided to the T input of the motor drive circuit 16 determines the rate at which the stepper motor rotates. The stepper motor 17 takes one step for each positive going transition of the square wave input provided to the T input. Accordingly, when a change in the setpoint is provided by the digital processor 10, the digital processor actuates the motor drive circuit 16 causing the stepper motor 17 to rotate in the direction required to effect the particular change desired. This rotation of the shaft 61 causes the wiper 62 of the potentiometer 14 to move along the resistive element 63 thereby changing the input voltage to the controller 12. During automatic setpoint changing, the movable contacts 24 and 28 of the switches 18 and 19 respectively, are in electrical contact with the fixed contacts 26 and 29 respectively so that the controller 12 causes changes in the regulation device 11. Because the output leads 66 and 67 of the potentiometer 14 are coupled to a setpoint indicator, a visual indication of the automatically established setpoint is provided to the operator.

When manual setting of the setpoint is desired, the operator moves the movable contacts 24 and 28 to the fixed contacts 26 and 29 of the switches 18 and 19 respectively and the process regulation device 11 is regulated by the controller 12. Simultaneous with this movement of the contacts 24 and 28, the mechanical coupling 58 rotates the movable contact 42 of the switch 41 into electrical contact with the fixed contact 43 and the repetitive output signal 39 of the generator 37 is coupled to the fixed contacts 46 and 47 of the switch 48. The operator next moves the movable contact 51 of the switch 53 to one of the fixed contacts 54 or 56 to either increase or decrease the setpoint. The mechanical coupling 52 moves the contact 49 to one of the fixed contacts 46 or 47 to apply the square wave signal 39 to the T input of the motor drive circuit 16. The motion of the contact 51 also actuates the contact 33 of the switch 21. However, because of the positioning of the contacts 24 and 28 of the switches 18 and 19 respectively, the regulation device 11 is under the control of the controller 12 and, therefore the switch 21 has no effect. When clockwise rotation of the stepper motor 17 is required, the movable contact 51 of the switch 53 is set to the grounded contact 54 putting a low signal on the R input of the motor drive circuit 16. When counterclockwise rotation is required, the movable contact 51 is set to the fixed contact 56 which is voltage biased. In either event, the movable contact 49 of the switch 54 is electrically coupled to the square wave output 39 of the generator 37 causing the motor 17 to step and change the setting of the wiper arm 62 of the potentiometer 14. As the voltage change occurs, the operator observes the setpoint indicator and when the desired setpoint is reached, the switch 41 is opened. Because the output leads 66 and 67 of the potentiometer 14 are electrically coupled to the digital processor 10, the manual setpoint change also results in a setpoint change within the digital processor. Accordingly, both automatic and manual changes of the setpoint result in the same change in the input voltage to the controller 12 so that changing between automatic and manual operation is possible without suffering the disadvantages caused by operational mode changes in the prior art devices.

What is claimed is:

1. In a process control system having a digital processor for optimizing the controlled process and including a regulation device selectively regulated manually or automatically by a controller to regulate a parameter of said process, a circuit for providing a common setpoint for both manual and automatic control comprising:
    variable voltage input means for providing a variable setpoint to said controller and to said digital processor;
    generator means for providing a repetitive output signal;
    means for varying said variable voltage input means to vary said setpoint, said means for varying being selectively responsive to said digital processor and to said repetitive output signal;
    switch means for selecting said manual and automatic control whereby said means for varying is responsive to said digital processor during automatic control and is responsive to said repetitive output signal during manual control, said switch means including a first plurality of switches arranged between said controller and said regulation device and a second plurality of switches arranged between said generator means and said means for varying, one portion of said first and second pluralities of switches being simultaneously actuatable for automatic control and another portion of said first and second pluralities of switches being simultaneously actuatable for manual control.

2. The circuit of claim 1 wherein said means for varying is a stepper motor.

3. The circuit of claim 1 wherein said controller means is a servo controller.

4. In a process control system having a digital processor for optimizing the controlled process and including a regulation device selectively regulated manually or automatically by a controller to regulate a parameter of said process, a circuit for providing a common setpoint for both manual and automatic control comprising:
    a potentiometer for providing a variable setpoint to said controller and to said digital processor;
    generator means for providing a square wave signal;
    means for varying said potentiometer to vary said setpoint, said means for varying being selectively responsive to said digital processor and to said square wave signal;
    switch means for selecting said manual and automatic control whereby said means for varying is responsive to said digital processor during automatic control and is responsive to said square wave signal during manual control, said switch means including a first plurality of switches arranged between said controller and said regulation device and a second plurality of switches arranged between said generator means and said means for varying, one portion of said first and second pluralities of switches being simultaneously actuatable for automatic control and another portion of said first and second pluralities of switches being simultaneously actuatable for manual control.

* * * * *